United States Patent
Sample

(10) Patent No.: US 7,309,132 B2
(45) Date of Patent: Dec. 18, 2007

(54) MODULAR KEYPAD ASSEMBLY

(75) Inventor: Greg Sample, Newberg, OR (US)

(73) Assignee: InFocus Corporation, Wilsonville, OR (US)

( * ) Notice: Subject to any disclaimer, the term of this patent is extended or adjusted under 35 U.S.C. 154(b) by 0 days.

(21) Appl. No.: 11/376,826

(22) Filed: Mar. 15, 2006

(65) Prior Publication Data

US 2006/0152692 A1 Jul. 13, 2006

Related U.S. Application Data

(63) Continuation of application No. 10/859,914, filed on Jun. 2, 2004, now Pat. No. 7,021,775.

(60) Provisional application No. 60/475,564, filed on Jun. 2, 2003.

(51) Int. Cl.
 G03B 21/14 (2006.01)
 G03B 21/00 (2006.01)
 G09G 5/00 (2006.01)
 G02F 1/1335 (2006.01)

(52) U.S. Cl. .................. 353/119; 353/122; 345/173; 349/16; 349/17

(58) Field of Classification Search ................ 353/119, 353/122; 454/184, 312; 399/73; 324/458; 345/3.1, 87, 173, 168; 349/16–17, 86, 88, 349/90; 174/32–397; 361/104, 720, 600
See application file for complete search history.

(56) References Cited

U.S. PATENT DOCUMENTS

| | | | |
|---|---|---|---|
| 4,022,993 A | 5/1977 | Shattuck | |
| 4,739,396 A | 4/1988 | Hyatt | |
| 5,596,343 A | 1/1997 | Snider | |
| 6,031,524 A * | 2/2000 | Kunert | 345/173 |
| 6,637,895 B2 | 10/2003 | Fujimori et al. | |
| 6,799,853 B2 * | 10/2004 | Silverbrook et al. | 353/122 |
| 7,021,775 B2 * | 4/2006 | Sample | 353/119 |
| 2002/0117315 A1 * | 8/2002 | Gabower | 174/35 R |

* cited by examiner

*Primary Examiner*—Diane Lee
*Assistant Examiner*—Magda Cruz
(74) *Attorney, Agent, or Firm*—Alleman Hall McCoy Russell & Tuttle LLP

(57) ABSTRACT

A modular keypad assembly for use with a projection device is provided. This modular keypad assembly may include a user input through which a user may operate the projection device. Such a modular keypad assembly may include a elastomer keypad, a keypad support plate; and a keypad circuit board.

7 Claims, 4 Drawing Sheets

MODULAR KEYPAD ASSEMBLY

CROSS-REFERENCE TO RELATED APPLICATIONS

This application is a continuation of and claims priority to U.S. patent application Ser. No. 10/859,914, filed on Jun. 2, 2004 now U.S. Pat. No. 7,021,775 and entitled "Modular Keypad Assembly," and also claims the benefit of U.S. Provisional Patent Application No. 60/475,564, filed on Jun. 2, 2003 and entitled "Modular Keypad Assembly." The entirety of each of the above named applications is herein incorporated by reference for all purposes.

TECHNICAL FIELD

The present disclosure relates generally to keypads and more specifically to a modular keypad assembly for an electronic device.

BRIEF DESCRIPTION OF THE DRAWINGS

The disclosure is illustrated by way of example and not by way of limitation in the figures of the accompanying drawings, in which the like references indicate similar elements and in which.

DETAILED DESCRIPTION

Figure 1:
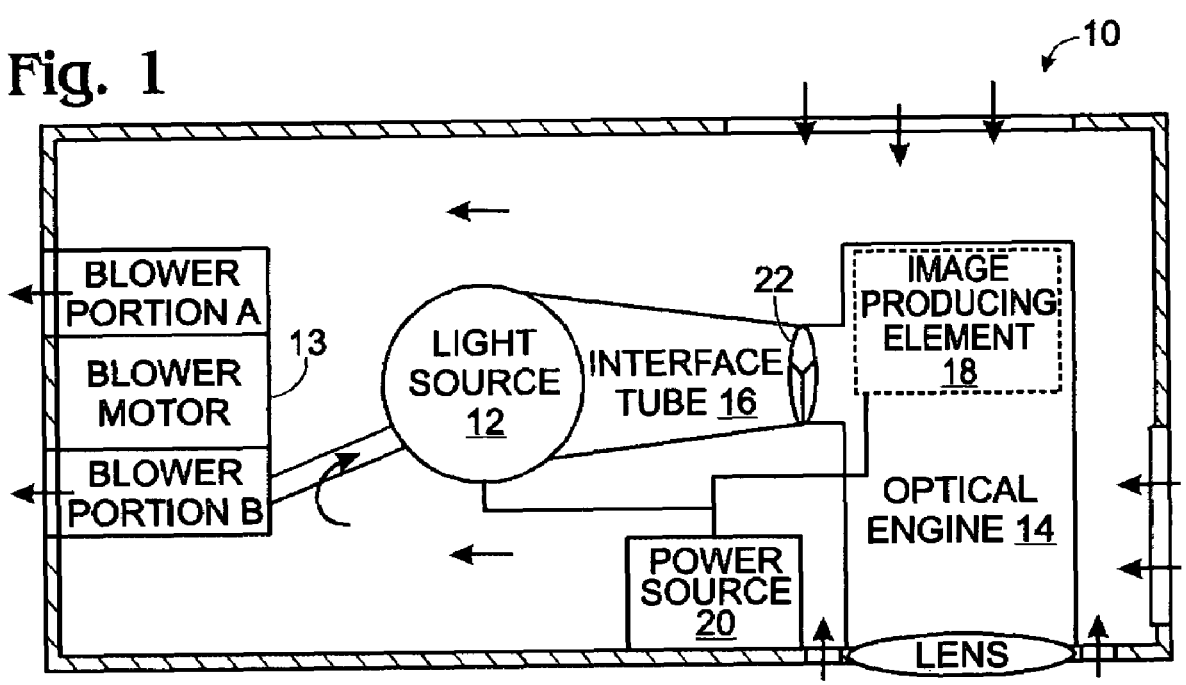
FIG. 1 is a schematic illustration of an exemplary projection device according to an embodiment of the present disclosure.

An exemplary projection device 10 is illustrated schematically in FIG. 1. Although described below in relation to a projection device, it should be appreciated that the present disclosure and the disclosed keypad assembly may be used in any suitable electronic device having user input devices, such as buttons, key pads, etc. For example, the keypad assembly described below may be incorporated within devices, including, but not limited to, televisions, display monitors, radios, speakers, appliances, printers, telephones, etc. Thus, it should be understood that the projection device described herein is intended for illustrative purposes and other devices may be used and are incorporated within this disclosure.

Projection device 10 may be adapted to project an image on a display surface, including, but not limited to, a screen, a wall, or other suitable viewing surface or area.

In some embodiments, projection device 10 may be a projector or image-generating device that is configured to project an image onto a display surface. As used herein, a projection device or image-generating device may include any suitable display device or image projector, including, but not limited to, a digital projector, a liquid crystal display (LCD) projector, a digital light processing projector, etc. Moreover, projection device 10 may be configured as a front projection device or a rear projection device.

In its most basic form, projection device 10 may include a light source (or lamp) 12 and an optical engine (or light engine) 14. Light source 12 may be adapted to produce a beam of light and project the light towards optical engine 14, which may be configured to generate an image. In some embodiments, light source 12 may include a lamp positioned within a reflector that is configured to direct most of the emitted light along an optical path of the system. The light source may include any suitable type of lamp. Examples include, but are not limited to, metal halide lamps and ultra-high-pressure (UHP) arc lamps, etc. The system also may include one or more filters, such as an infrared (IR) or ultraviolet (UV) filter, to filter out unwanted parts of the emission spectra of the lamp.

Light produced from light source 12 may be channeled or directed along an optical path through an interface tube or spacer 16 to optical engine 14. The interface tube 16 may incorporate a color wheel 22 through which light passes to allow the projection of color images. Optical engine 14 may include filters, lenses, mirrors, integrators, condensers, other optical elements, or combinations thereof.

Typically, optical engine 14 includes an image-producing element 18, and other optics. Image-producing element 18 may include any suitable image-generation device, including, but not limited to, a digital micromirror (DMD), an LCD panel, or any other suitable image source. Image-producing element 18 may be configured to project light toward one or more mirrors or other optics, which, in turn, may be configured to reflect light toward a display surface.

Projection device 10 also may include one or more power source 20. Power source 20 may be linked to light source 12, image-producing element 18, and/or other components of projection device 10. Air may flow through one or more ventilation devices (not shown here) and may flow in the direction of the arrows depicted in FIG. 1. This flow may be directed in part by a blower 13.

The projection device 10 may further include multiple user inputs (not shown in FIG. 1). These user inputs may allow a user to control the functioning and operation of the projection device. For example, a user may use a user input to power the device on, position the projection device so that the image is projected to a desired position on a display screen, focus the lens, orientate the image, etc. Such user inputs may include dials, buttons, touch pads, infrared light sensors, etc.

Figure 2:
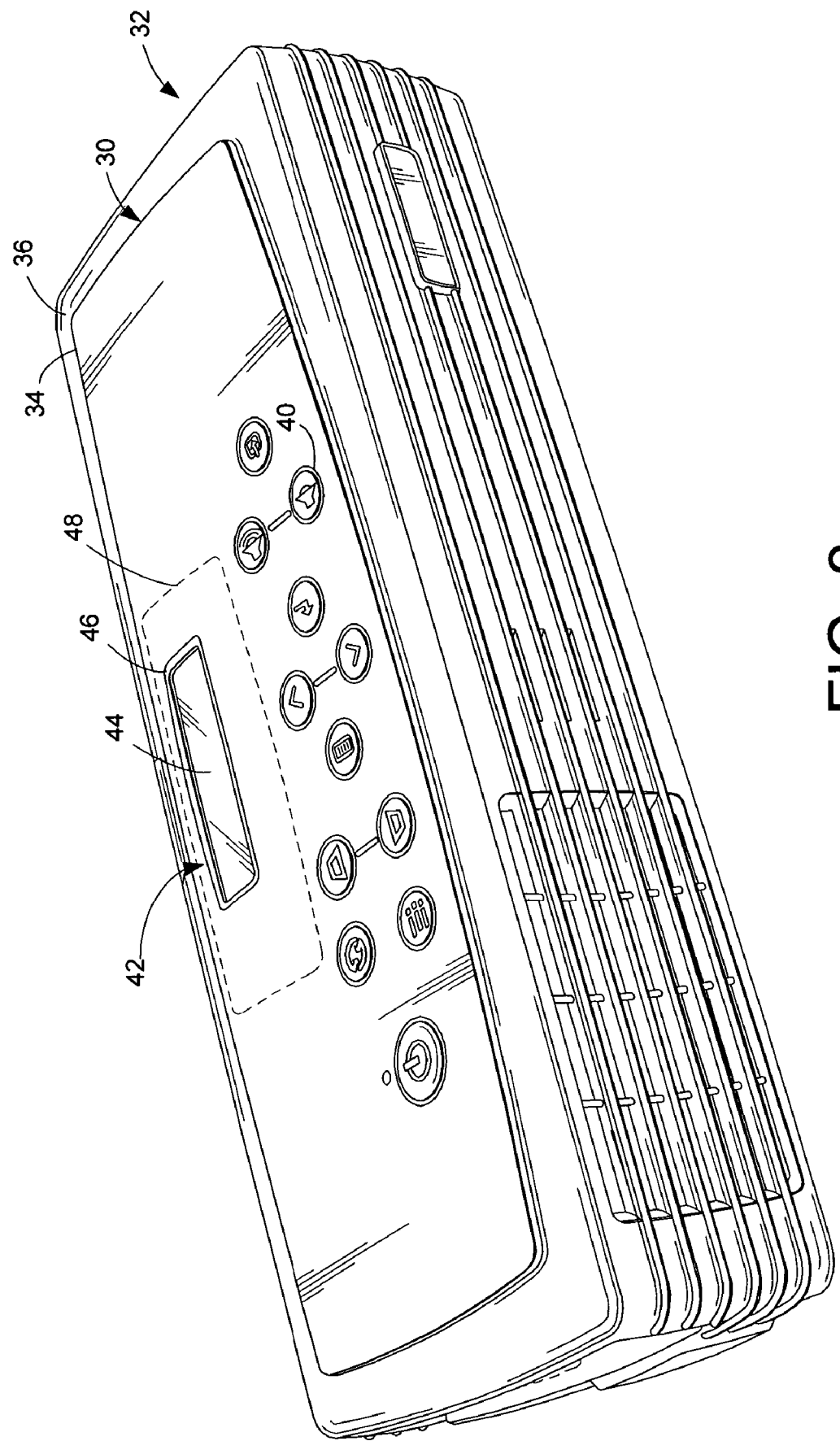
FIG. 2 is a schematic illustration of an exterior of the exemplary projection device shown in FIG. 1 including a modular keypad assembly.

FIG. 2 illustrates an embodiment of the projection device shown in FIG. 1. Specifically, FIG. 2 illustrates an exemplary configuration for the exterior of projection device 10. It should be appreciated that various other exterior configurations are possible without departing from the scope of the disclosure.

As shown in FIG. 2, the projection device includes a modular keypad assembly 30 and a body 32. The modular keypad assembly 30 is disposed on the top of the projection device body 32 illustrated in FIG. 2. However, a modular keypad assembly may be selectively positioned on any portion of a projection device body, including a side, front, back, bottom, etc.

Modular keypad assembly 30 may include a perimeter edge 34. In some embodiments, modular keypad assembly perimeter edge 34 may be raised relative to body edge 36. Alternatively, modular keypad assembly edge 34 may be flush with body edge 36, or even recessed in relation to body edge 36.

Modular keypad assembly 30 may include one or more user inputs 40. As shown here, user inputs 40 may be a plurality of buttons, but other possible user inputs may include touch pads, dials, switches, keys, infrared sensors, etc. A user may manually manipulate by pressing or pushing the button to control or operate the projection device. In some embodiments, other methods may be used to activate/deactivate one or more user inputs, for example some user inputs may be configured to receive signals via an infrared light source or other source. Regardless of the method of activation, the user inputs enable a user to selectively control functions of the projection device.

Other components may also be incorporated within modular keypad assembly 30. For example, a user display, such as a liquid crystal display (LCD) 44 and associated LCD assembly 42 may be integrated or partially integrated within the keypad assembly 30, as shown in FIG. 2. LCD assembly 42 may include a LCD display with a perimeter bezel 46. The liquid crystal display screen may be sealed between the elastomer keypad and the liquid crystal bezel. LCD assembly may include the components as described below in regards to modular keypad assembly. As used herein, a user display should be considered as a user input, and may be incorporated within modular keypad assembly 30.

It should be noted that while the modular keypad assembly 30 of FIG. 2 substantially corresponds to the entire top panel of the projection device, the dimensions of the modular keypad assembly may vary depending on manufacturer's preference and size of the projection device. Thus, the modular keypad assembly may be only a small portion of one or more sides of a projection device. Additionally, a projection device may contain multiple modular keypad assembly portions. For example, user display 42 may be an integrated assembly within keypad assembly 30, or in some embodiments, user display 42 may be contained within a second assembly 48. This second assembly may be configured to be disposed within assembly 30 or may be configured to be disposed directly within projection device 32.

Figure 3:
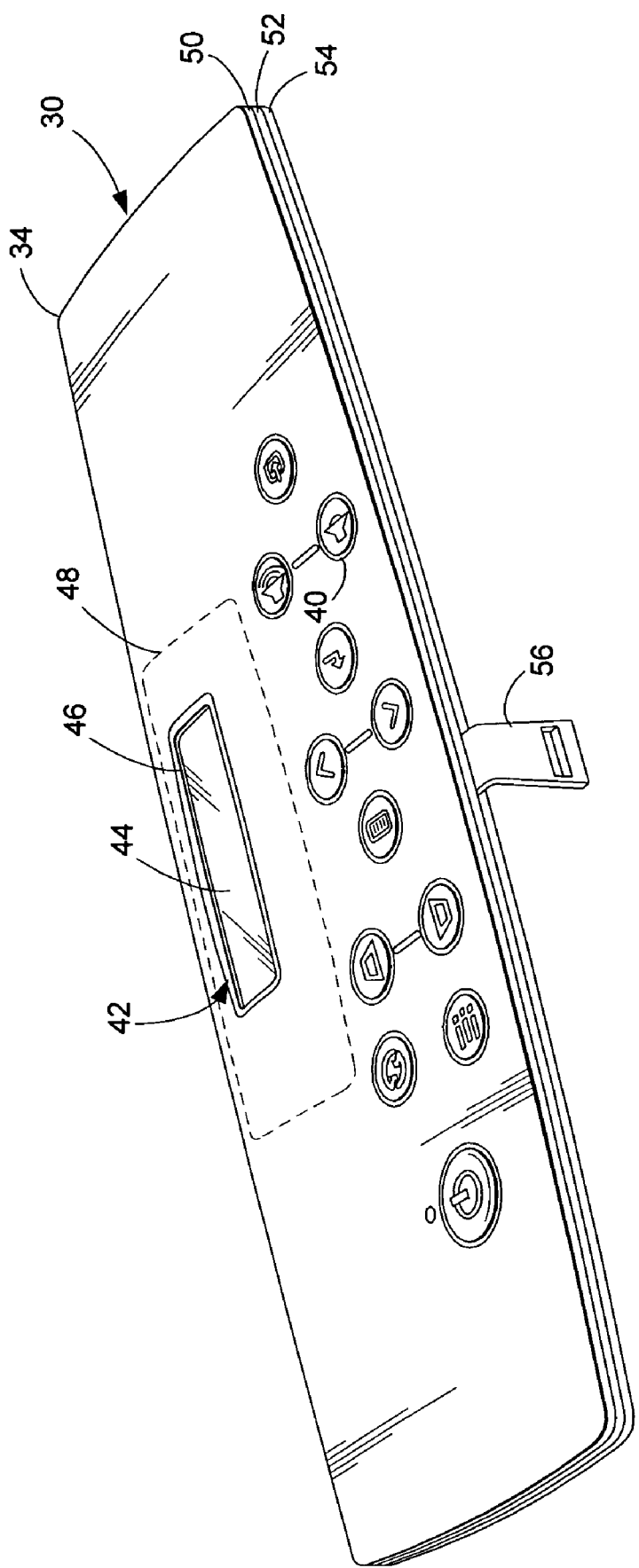
FIG. 3 is a perspective view of the modular keypad assembly of FIG. 2.

FIG. 3 illustrates a top view of the modular keypad assembly 30 isolated from projection device 10 illustrated in FIG. 2. As seen in FIG. 3, in some embodiments, modular keypad assembly 30 may include multiple layers. Each layer may be composed of one or more components. For example, in some embodiments, the following components may be disposed in one or more layers: an elastomer keypad 50, a keypad circuit board 52, a keypad support plate 54. In some embodiments, each component may correspond to a single layer. However, in other embodiments, one or more of the components may be incorporated in the same layer.

The layers may be secured by any suitable method. For example, in some embodiments, one or more types of adhesives, including glue, plastics, rubbers, etc. may function to hold the various modular keypad assembly components together. Such adhesives may further be configured to space the layers a suitable distance apart, enabling proper functioning of the components in the layers. The use of adhesives to secure the various layers and/or components together may simplify and decrease time to assemble the modular keypad assembly. In other embodiments, fasteners, such as screws or other suitable device for securing one or more layers to the other layers may be used.

The modular keypad assembly may be assembled independent of the other projection device parts. Thus, prior to placement of modular keypad assembly 30 onto the projection device body 32, a large hole or opening may exist on the body such that internal device components may be exposed. This modular method of keypad assembly may simplify final assembly of the projection device. Moreover, the modular nature may permit a finished sub-assembly to be completed and tested without the need for final product assembly. By decreasing time of assembly and difficulty in assembly and testing, it may be possible to decrease production costs of the projection device.

As discussed above, the modular keypad assembly 30 may be positioned within the external surface of the projection device. In some embodiments, the modular keypad assembly 30 may be shaped to conform to the external profile of a projection device surface. For example, in conforming to this profile, the keypad support plate 54, and thus, the entire modular keypad assembly, may be capable of occupying a minimum amount of the available internal volume of the projection device. This space-saving mechanism may be particularly beneficial in compact electronic devices where internal volume is limited. Specifically, these size restraints may be evidenced with portable projection devices that are typically of a compact size and have significant internal and external space limitations. The use of a layered modular keypad assembly may reduce the amount of space, or footprint, that the keypad and associated components typically require from the projection device.

The layered design of the modular keypad assembly may enable the keypad assembly to extend over a large surface area and be contoured to a specific product's design. It should be appreciated that the disclosed keypad assembly may be used as a "platform" and integrated into other projection or other suitable electronic device architectures.

The keypad assembly further may be utilized to dissipate heat produced within the projection device. For example, lamp-generated heat may be significant within the projection device and the keypad assembly may provide a method of dissipating such lamp-generated heat. Thus, use of the layered keypad assembly may enable the keypad assembly to operate as an active heat sink for various components within the projection device. Additionally, EMI strips or other insulation materials may be used between one or more layers of the modular keypad assembly.

Modular keypad assembly 30 may be retained within the body of a projection device using any suitable retainers or fasteners, including a flange retainer 60. Other suitable retainers may include EMI components, e-rings, screws, crushed ribs, perimeter flanges, pull-thru darts, etc. In addition, to provide mechanical retention of a modular keypad assembly to the projection device body, such a retainer may provide some conductivity for EMI purposes.

In the embodiment of FIG. 3 keypad assembly 30 may be compression fit into the body of projection device such that one side of the keypad assembly may be mechanically wedged into the corresponding side of the projection device. For example, in FIG. 3, keypad assembly 30 may be compression fit into the top side of the projection device. The opposing side may be retained by flange retainers 56. These flanges many be composed of any suitable materials, including, but not limited to, metals such as aluminum, steel, magnesium, etc., plastics, composites, etc.

The method of attachment of the keypad assembly may have a significant aesthetic appearance that makes the modular keypad assembly appear to be floating within the body of the projection device. Such an appearance may be due to the lack of visible means of retention. The compression fitting may make the overall product appear streamlined and smooth, as no fasteners may be externally visible. Such a streamlined profile reduces materials from grabbing or otherwise catching on fasteners, dials, buttons, etc. on the projection device body.

Figure 4:
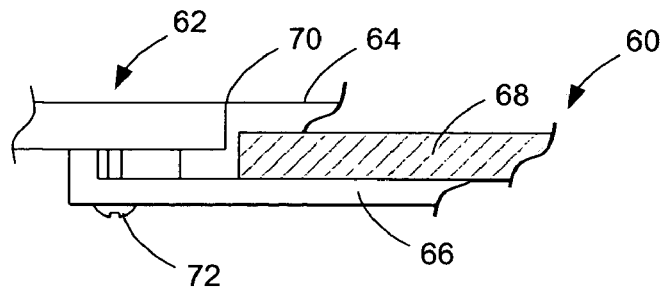
FIG. 4 is a cross-sectional view of a modular keypad assembly according to an embodiment of the present disclosure.

FIG. 4 illustrates a side view of a modular keypad assembly according to an embodiment of the present disclosure. As shown in this embodiment, the modular keypad assembly 60 is a multi-layered form, which is placed adjacent to the projection device body edge 62. The modular keypad assembly may include an elastomer keypad 64 on the exterior aspect of the projection device. The keypad assembly may further include a keypad support plate 66 (also referred to as a stiffener plate) on the interior aspect of the projection device. Various components may be integrated between these two layers, including a keypad circuit board, or printed circuit assembly (PCA) 68, an LCD assembly, an infrared sensor, etc. The PCA may contain keypad and LCD circuits.

The external elastomer keypad may be composed primarily of silicone. However, other suitable elastic materials may be used, including flexible polymers, latex, rubber, etc. These elastic materials may be capable of being deformed, yet resume an original shape when a deforming force is removed.

The elastomeric outer layer may assist in forming a moisture resistant seal or liquid barrier 70 between the modular keypad assembly 60 and the projection device body edge 62, by providing compression around the entire modular key assembly perimeter. Such a moisture-resistant seal, or perimeter seal, may prevent liquids, dust or other particles from entering into the interior of the projection device. Additionally, crush ribs or other retention devices may be placed along the external perimeter of the modular keypad assembly to assist in creating such an effective moisture barrier.

As the elastomer keypad is on the external surface, it may aesthetically enhance appearance of the projection device. Due to its elastic properties, the elastomer keypad may be compressed without buckling. Further, the elastic materials may be more resistant to scratching as compared to other materials that are not as elastically resilient. Such a configuration may impact a users satisfaction with the device. For example, a user's satisfaction with the device may be enhanced if the user inputs are easy to use, reliable and resistant to breakdown from repetitive use, resistant from injury, etc.

The elastomer keypad may be attached to the keypad support plate via an adhesive, such as a die-cut, two-sided pressure-sensitive adhesive (PSA)(not shown). However, in some embodiments, e-rings, screws, pull-thru darts or other suitable retainers may be used to compress the elastomeric keypad 64 against the support plate 66. Further, a LCD assembly (not shown here) may be sealed by an adhesive between an elastomer keypad and a LCD bezel (not shown here).

The keypad support plate 66 may provide a stable, stiff surface upon which the modular keypad assembly may be based. As a result of this stiff base, the modular keypad assembly may be capable of enduring repetitive user input manipulations including, but not limited to, rough button pushing, switching movements, dial turnings, etc., without deforming. For example, the use of the stiffener board prevents the keypad circuit board from excessive flexing. Typically, the keypad support plate is composed of aluminum, however other rigid materials may be used, including, but not limited to, magnesium, stiff plastics, composites, etc.

The modular keypad assembly 60 of FIG. 4 is retained to the projection body edge 62 by the use of one or more retainers 72. Retainers 72 are depicted here as being screw fasteners, however, any other suitable fasteners may be used without departing from the scope of the disclosure. As discussed above, any suitable retainer may be used to stabilize the modular keypad assembly within the projection device body.

FIGS. 5 through 8 show a variety of alternative embodiments for a modular keypad assembly. Such illustrations are provided as examples and are not intended to be limiting in any sense.

Figure 5:
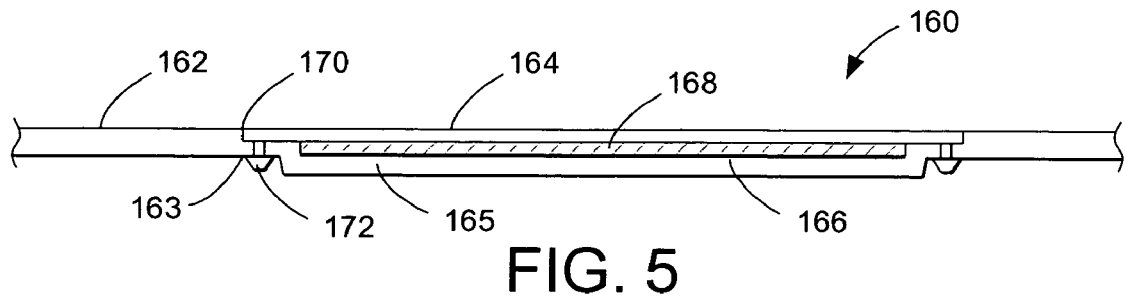
FIG. 5 is a cross-sectional view of a modular keypad assembly according to an embodiment of the present disclosure.

FIG. 5 illustrates a modular keypad assembly 160 attached to a projection device body edge 162 that may include a step-down portion 163 and a recessed portion 165. The recessed body portion 165 may cover all or a portion of the top of the projection device body. Thus, in this embodiment, the projection device may include a platform integrated within the internal region of the projection device for attachment of modular keypad assembly 160.

In the embodiment of FIG. 5, the modular keypad assembly 160 may include an elastomer keypad 164, a PCA 168, and keypad support plate 166. The recessed body portion 165 may further support the modular keypad assembly. The modular keypad assembly shown here may be attached to the recessed body portion 165 via pull-thru darts 172.

Figure 6:
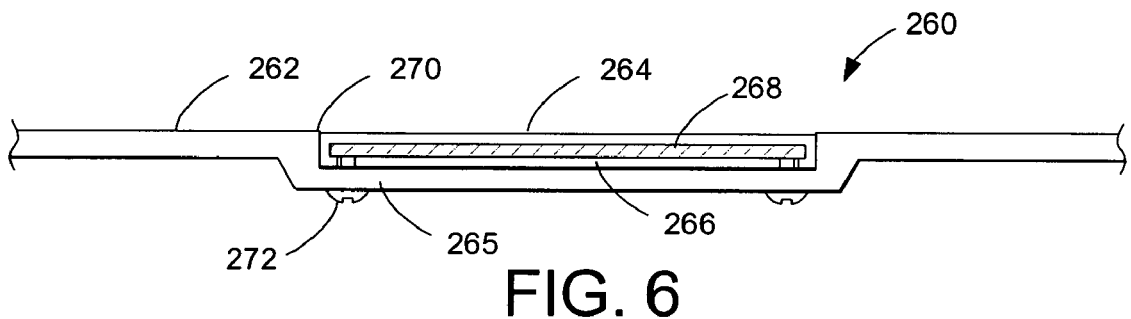
FIG. 6 is a cross-sectional view of a modular keypad assembly according to an embodiment of the present disclosure.

The embodiment illustrated in FIG. 6, modular keypad assembly 260, may include an elastomer keypad wrapped around a PCA 268, affixed on top of a keypad support plate 266. As shown here, the elastomer keypad layer is wrapped entirely around the PCA. However, it may be appreciated that other embodiments may include an elastomer keypad wrapping around only a portion of the PCA such as the top and periphery, while the bottom of the PCA is not in contact with the elastomer keypad. Modular keypad assembly 260 may be attached to a recessed portion 265 of the projection device body edge 262 via fasteners 272, depicted here as screws.

Figure 7:
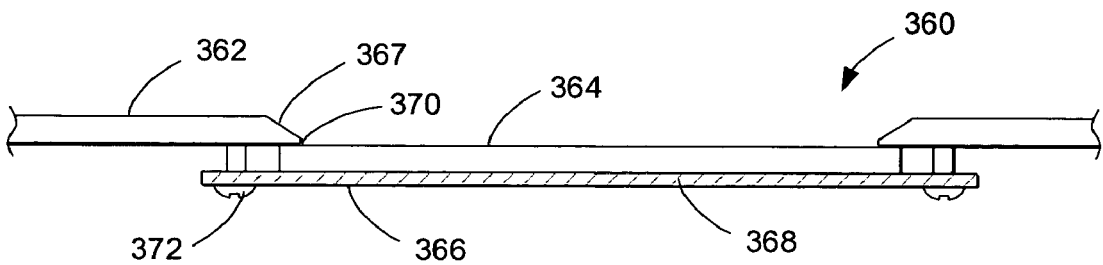
FIG. 7 is a cross-sectional view of a modular keypad assembly according to an embodiment of the present disclosure.

FIG. 7 illustrates another exemplary modular keypad assembly 360 that is integrated with a projection device body edge 362. Projection device includes a sloped or beveled portion 367. The beveled portion may contact and compress an elastomer keypad 364 of modular keypad assembly 360 and may form a moisture barrier 370. Modular keypad assembly may be attached to the body edge 362 via a fastener 372, which may pass through the keypad support plate 366 and PCA 368.

Figure 8:
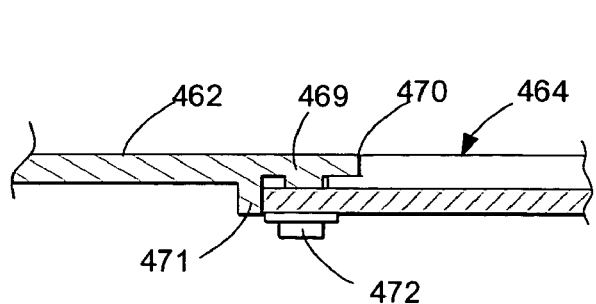
FIG. 8 is a cross-sectional view of a modular keypad assembly according to an embodiment of the present disclosure.

Similarly, the embodiment of FIG. 8 may include a body edge 462 adapted to compress the elastomer keypad 464 of modular keypad assembly 460. Body edge 462 may include a shallow portion 469 and an interior protrusion 471. The shallow portion may serve to provide a compressing force along the perimeter of the elastomer keypad 464 and may thus form a moisture barrier 470. The subassembled modular keypad assembly may be attached to body edge 462 by fasteners 472, depicted here as an e-ring.

Although the present exemplary embodiments illustrate the use of a modular keypad assembly in a projection device, it should be appreciated that the modular keypad assembly may be used in any suitable device that may require user inputs. For example, the modular keypad assembly may be used in electronic devices, such as televisions, display monitors, radios, speakers, etc.

Although the present disclosure includes specific embodiments, specific embodiments are not to be considered in a limiting sense, because numerous variations are possible. The subject matter of the present disclosure includes all novel and nonobvious combinations and subcombinations of the various elements, features, functions, and/or properties disclosed herein. The following claims particularly point out certain combinations and subcombinations regarded as novel and nonobvious. These claims may refer to "an" element or "a first" element or the equivalent thereof. Such claims should be understood to include incorporation of one or more such elements, neither requiring, nor excluding, two or more such elements. Other combinations and subcombinations of features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

What is claimed is:

1. A modular keypad assembly including at least one user input for use with a projection device, the modular keypad assembly comprising:
    a keypad in operative communication with a keypad circuit board; and
    a keypad support plate contoured to substantially match an aperture in the projection device enclosure adapted to receive the modular keypad assembly, wherein the contour of the keypad support plate creates a perimeter overlap with the projection device enclosure, and wherein contact between the keypad support plate and the projection device enclosure facilitates electromagnetic interference (EMI) conductivity in the projection device enclosure.

2. The modular keypad assembly of claim 1, wherein the modular keypad assembly is configured to be flush with a projection device enclosure surface edge when installed in the projection device.

3. The modular keypad assembly of claim 1, wherein the keypad support plate comprises openings configured to receive retention pins extending from an interior portion of the projection device enclosure.

4. The modular keypad assembly of claim 3, wherein the projection device enclosure further comprises hooks configured to retain the modular keypad assembly in the projection device enclosure.

5. The modular keypad assembly of claim 4, wherein the hooks and pins are made at least partially of an electromagnetic shielding material.

6. The modular keypad assembly of claim 4, wherein the modular keypad assembly further comprises at least one electromagnetic interference strip to retain the pins.

7. The modular keypad assembly of claim 1, wherein the modular keypad assembly further comprises a display screen.

* * * * *